(12) United States Patent
Wright

(10) Patent No.: US 10,558,446 B2
(45) Date of Patent: Feb. 11, 2020

(54) METHODS, SYSTEMS, AND COMPUTER PROGRAM PRODUCTS FOR MONITORING AND CONTROL OF A CHANGES TO COMPUTER APPARATUS AND/OR VIRTUAL MACHINES BY MEANS OF A MANAGEMENT SYSTEM VIA A NETWORK

(71) Applicant: OverNet Data Management Limited, Northamptonshire (GB)

(72) Inventor: Anthony Wright, Northamptonshire (GB)

(73) Assignee: Overnet Data Management Limited, Northamptonshire (GB)

( * ) Notice: Subject to any disclaimer, the term of this patent is extended or adjusted under 35 U.S.C. 154(b) by 0 days.

(21) Appl. No.: 14/443,317

(22) PCT Filed: Nov. 18, 2013

(86) PCT No.: PCT/GB2013/000495
§ 371 (c)(1),
(2) Date: May 15, 2015

(87) PCT Pub. No.: WO2014/076447
PCT Pub. Date: May 22, 2014

(65) Prior Publication Data
US 2015/0293756 A1  Oct. 15, 2015

(30) Foreign Application Priority Data
Nov. 16, 2012  (GB) .................................. 1220692.6

(51) Int. Cl.
*G06F 9/455*  (2018.01)
*G06F 8/61*  (2018.01)
(Continued)

(52) U.S. Cl.
CPC ............ *G06F 8/61* (2013.01); *G06F 9/45558* (2013.01); *G06F 11/1464* (2013.01);
(Continued)

(58) Field of Classification Search
None
See application file for complete search history.

(56) References Cited

U.S. PATENT DOCUMENTS 8,799,709 B2 * 8/2014 Iikura ................. G06F 11/1415
714/19
8,972,978 B2 * 3/2015 Astete ................. G06F 9/45533
718/1
(Continued)

FOREIGN PATENT DOCUMENTS

EP         2383652 A1   11/2011
WO    2014076447 A2    5/2014
WO    2014076447 A3    5/2014

OTHER PUBLICATIONS

Foreign communication from the priority application—International Search Report and Written Opinion, PCT/GB2013/000495, dated Aug. 28, 2014, 16 pages.
(Continued)

*Primary Examiner* — Bing Zhao
(74) *Attorney, Agent, or Firm* — Conley Rose, P.C.; Rodney B. Carroll

(57) ABSTRACT

In one aspect, a method of monitoring a computer apparatus by means of a management system via a network is provided, the method comprising: establishing a connection between the computer apparatus and the management system via the network, the computer apparatus being located at a first location and the management system being located at a second location remote from the first location; installing a controller and creating on the computer apparatus at least one virtual machine, the or each virtual machine being
(Continued)

monitored by the controller; monitoring one or more characteristics of the computer apparatus and/or the or each virtual machine and generating monitoring results based on the characteristics; and reporting the monitoring results to the management system via the network. A corresponding system may also be provided. In one embodiment, characteristics of the computer apparatus include the state of the at least one virtual machine or the state of the one or more programs running within the at least one virtual machine and monitoring results include state information indicative of the state. In a second aspect, a method and system of establishing a connection between a computer apparatus and a management system via a network, and a corresponding controller for connecting a virtual machine to a network. In a third aspect, a method of configuring a virtual machine is provided. In a fourth aspect, a method of controlling data flow between one or more peripheral devices and a virtual machine on a computing apparatus is provided.

35 Claims, 11 Drawing Sheets

(51) Int. Cl.
G06F 11/14 (2006.01)
H04L 12/26 (2006.01)
H04L 29/08 (2006.01)

(52) U.S. Cl.
CPC .............. *H04L 43/10* (2013.01); *H04L 67/10* (2013.01); *H04L 67/141* (2013.01); *G06F 2009/45591* (2013.01); *G06F 2201/875* (2013.01)

(56) References Cited

U.S. PATENT DOCUMENTS

| | | |
|---|---|---|
| 2008/0295095 A1 | 11/2008 | Watanabe et al. |
| 2009/0024994 A1 | 1/2009 | Kannan et al. |
| 2011/0296231 A1 | 12/2011 | Dake |
| 2012/0215917 A1 | 8/2012 | Ramamurthy |
| 2013/0227335 A1* | 8/2013 | Dake .................. G06F 11/0709 714/4.2 |

OTHER PUBLICATIONS

Foreign communication from the priority application—International Preliminary Report on Patentability, PCT/GB2013/000495, dated May 19, 2015, 11 pages.

* cited by examiner

METHODS, SYSTEMS, AND COMPUTER PROGRAM PRODUCTS FOR MONITORING AND CONTROL OF A CHANGES TO COMPUTER APPARATUS AND/OR VIRTUAL MACHINES BY MEANS OF A MANAGEMENT SYSTEM VIA A NETWORK

CROSS-REFERENCE TO RELATED APPLICATIONS

This application is a filing under 35 U.S.C. 371 of International Application No. PCT/GB2013/000495 filed Nov. 18, 2013 entitled "Software Deployment and Control Method and System," claiming priority of Great Britain Patent Application No. 1220692.6 filed Nov. 16, 2012, which applications are incorporated by reference herein in their entirety.

FIELD OF INVENTION

The present invention relates to methods, systems and computer program products providing monitoring and control of computer apparatus and/or virtual machines by means of a management system via a network.

BACKGROUND

The deployment of services associated with software can be time consuming and complicated for networks that include a large number of devices on which the software is to be deployed. Even when software is delivered to a device, the reliability of the software may need to be checked. This can be difficult to achieve when the user of the device is not capable of diagnosing any problems quickly and correctly. Furthermore, as the number of devices increases, the load on the network will likely increase. There is a desire to be able to manage devices.

SUMMARY

From a first aspect, the present invention provides a computer implemented method of monitoring a computer apparatus by means of a management system via a network, the method comprising:
establishing a connection between the computer apparatus and the management system via the network, the computer apparatus being located at a first location and the management system being located at a second location remote from the first location;
installing a controller and creating on the computer apparatus at least one virtual machine, the or each virtual machine being monitored by the controller;
monitoring one or more characteristics of the computer apparatus and/or the or each virtual machine and generating monitoring results based on the characteristics;
reporting the monitoring results to the management system via the network.

Embodiments of the invention can provide management control of and monitoring of resources and control access to resources and facilitate maintenance of the software products.

The characteristics of the computer apparatus may include the state of the at least one virtual machine or the state of the one or more programs running within the at least one virtual machine and monitoring results include state information indicative of the state.

From a second aspect, the present invention provides a system comprising:
means for establishing a connection between the computer apparatus and the management system via the network, the computer apparatus being located at a first location and the management system being located at a second location remote from the first location;
the computer apparatus comprising at least one virtual machine and a controller for monitoring one or more characteristics of the computer apparatus and/or the or each virtual machine and generating monitoring results based on the characteristics; and
a management system for connecting to the computer apparatus and receiving the monitoring results.

From a third aspect, a computer program product is provided for controlling one or more computer programs for a computer apparatus by means of a management system via a network, the computer program product comprising a computer-readable storage medium having computer-readable program code embodied therewith, the computer-readable program code configured to carry out the aforementioned method.

From a fourth aspect, a computer apparatus is provided comprising one or more computer programs, the computer apparatus having at least one virtual machine, the computer apparatus being capable of connecting to a management system via a network for the control of one or more computer programs, the computer apparatus further comprising a controller for the control of the or each virtual machine, and for monitoring the computer apparatus and providing monitoring results representative of the state of the at least one virtual machine or the state of the one or more programs running within the at least one virtual machine and generating state information indicative of the state, wherein the controller is located between the one or more computer programs and the or each virtual machine.

From a fifth aspect, a method and system of establishing a connection between a computer apparatus and a management system via a network, the computer apparatus being located at a first location and the management system being located at a second location remote from the first location, comprising establishing a tunnel between a node associated with the computer apparatus and a master node associated with the management system, wherein the connection comprises establishing a secure connection between the computer apparatus and the management system through the tunnel and the secure connection is established between the node associated with the computer apparatus and the master node associated with the management system using a virtual private network connection, wherein the virtual private network connection protects data with encryption and/or authentication and/or integrity protection.

From a sixth aspect, method of and corresponding controller for configuring a virtual machine for connection to a network, comprising: analysing existing network characteristics of the network; sending the existing network characteristics to a central management system; generating a subnet structure defining network parameters related to the network from the existing network characteristics, the network parameters including a plurality of addresses selectable by a user; receiving a selection of one of the plurality of addresses; and configuring the virtual machine with the selected address and other network parameters, and the preferable step of connecting the virtual machine to the network.

From a seventh aspect, a method of and corresponding system for controlling data flow between one or more peripheral devices and a virtual machine on a computing apparatus, comprising: providing a first operating system on the virtual machine for access by a user of the computer apparatus, providing a second operating system to communicate with one or more peripheral devices connected to the computer apparatus; and managing data flow between the first operating system and second operating system via a controller located outside the computing apparatus.

BRIEF DESCRIPTION OF THE DRAWINGS

Preferred embodiments of the present invention will now be described, by way of example only, with reference to the following drawings in which.

DETAILED DESCRIPTION OF THE EMBODIMENTS

A detailed description is now provided with reference to the abovementioned figures.

Figure 1:
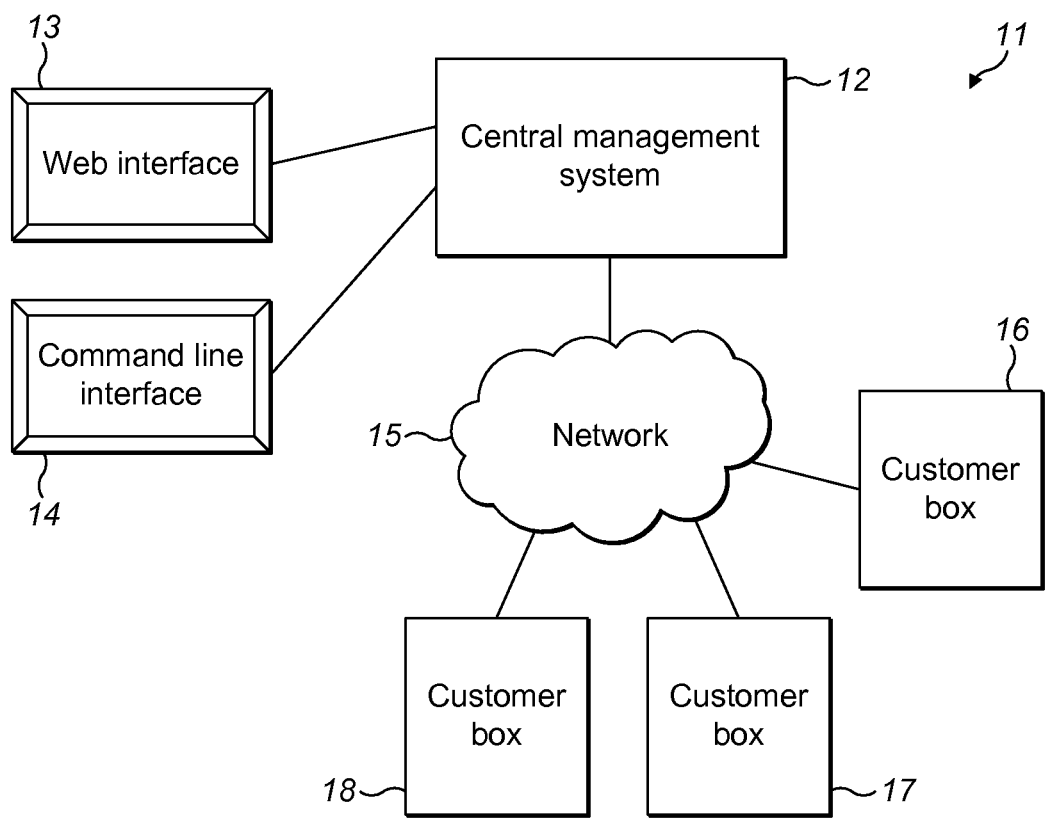
FIG. 1 represents an exemplary network architecture according to an embodiment of the invention.

As illustrated in FIG. 1, the architecture 11 according to a preferred embodiment of the invention comprises a management system 12 connectable to a network 15. The network 15 can for example be a global network such as the Internet or a Local Area Network (LAN) or any other network such as a packet based network or circuit switched network or a combination of such networks. The architecture 11 according to a preferred embodiment further comprises at least one data processing device 16, and preferably a plurality of devices 16, 17, 18, connectable to the network 15. With particular reference to device 16, in this embodiment it is a hardware device that operates in accordance with instructions from at least one computer program running on the device. Such a device 16 is provided to a user or other client entity (which may be another program) for the purpose of accessing a software product, and enables managing said software product or other services. The other devices 17, 18 may be similar to device 16.

Referring to FIG. 1, each device 16, 17, 18 provided for a user or client, and the management system 12, are each connected to the network 15, such that the management system 12 and each of the devices 16, 17, 18 are capable of communicating by various means employed by the network 15. The management system 12 is capable of controlling some or all aspects of the operation of the devices 16, 17, 18. For the purpose of managing and/or controlling the devices 16, 17, 18 and the software running on the devices 16, 17, 18, at least one interface is provided in association with the management system 12. Such an interface is advantageously used for making requests to the management system 12, which management system 12 subsequently forwards the commands corresponding to said requests to one or more of the devices 16, 17, 18. Referring to FIG. 1, in this particular embodiment, various interfaces can be provided such as a Web interface 13 and a Command Line Interface 14 which are provided for facilitating the management of the devices. In a typical end user's data processing device 16, the web interface 13 is used for the majority of the most popular tasks, and a command line interface 14 is usable by system administrators and users who have a high level of technical skill and knowledge.

Figure 2:
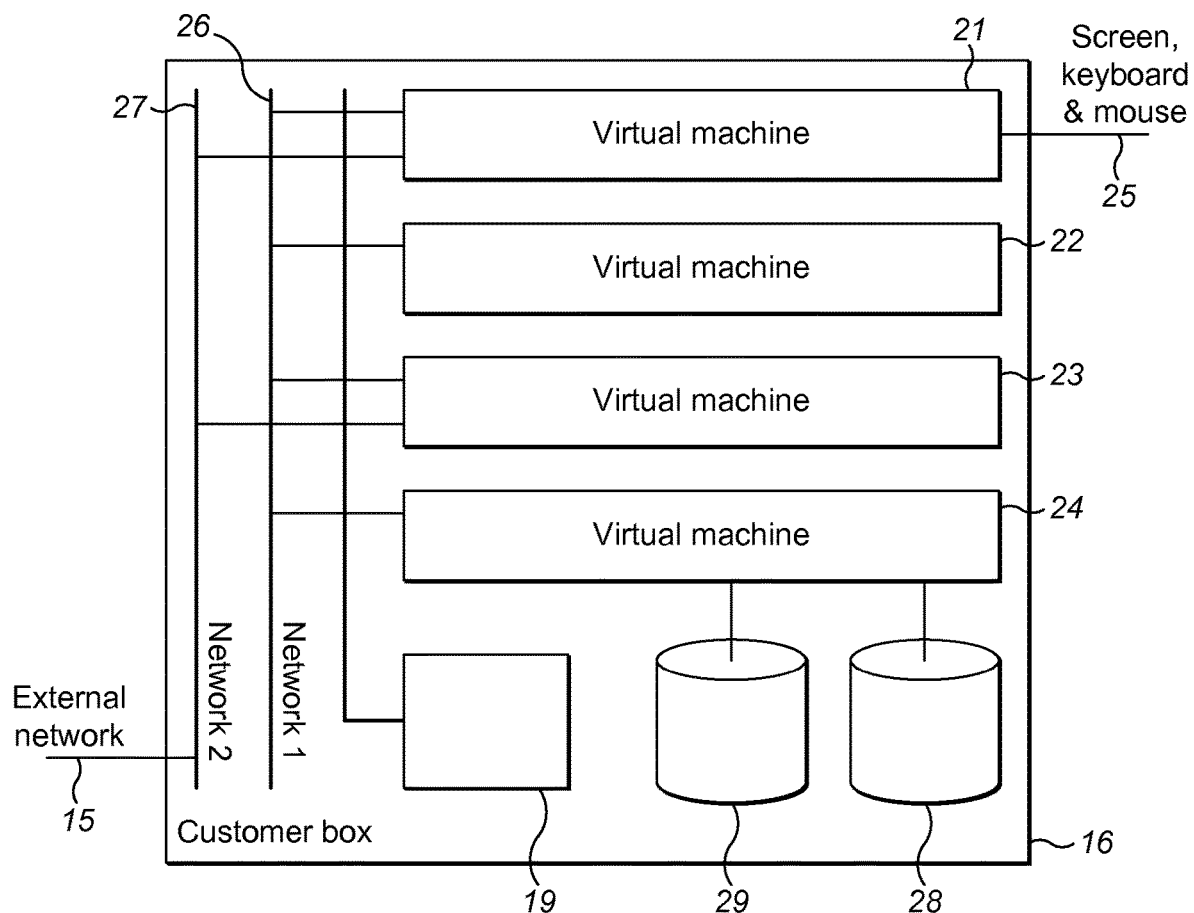
FIG. 2 is a schematic representation of a device architecture comprising a plurality of virtual machines running on at least one device shown in FIG. 2.

FIG. 2 illustrates the device architecture of one or more of the devices 16, 17, 18, and shows a set of virtual machines 21, 22, 23, 24 created in the one or more devices 16, 17, 18. For ease of explanation, only device 16 will be referred to when referring to this figure but it will be appreciated that each device 17, 18 may be provided with similar components to device 16. The virtual machines 21, 22, 23, 24 are created by software provided in the device 16. The software includes an operating system for controlling the hardware of the device 16 and the communications between the device 16 and the management system 12. For the purpose of this description, the term "device agent" 19 is used to identify the software employed in the device 16.

The virtual machines 21, 22, 23, 24 are given access to various resources by the device agent 19. The virtual machines 21, 22, 23, 24 may also be given access to at least one network connection 26, 27 and to external network connection 15 through networks connections 26, 27. One selected virtual machine 24 may be given access to one or more sections (such as partitions) of at least one hard disk 28, 29 of the device 16. The selected virtual machine 24 then makes available storage on these hard disks to other virtual machines 21, 22, 23 which are not directly connected to said hard disk 28, 29 by means of a network 26 so that the at least one hard disk 28, 29 will appear to be directly connected to the virtual machines 21, 22, 23, via a networked filesystem such as NFS, via a networked database such as PostgreSQL, or other protocols that make storage available over a network. Of course, the presented configuration is not limiting and other configurations including a plurality of disks directly connected to one or a set of the totality of virtual machines is not excluded from the scope of this embodiment. According to some embodiments, the virtual machine 21, 22, 23, 24 is capable of accessing at least hardware component 25 connected to the data processing device 16. Such components 25 accessible by the virtual machine may include a computer screen, a computer keyboard, a computer mouse or other components connectable to a computer type of hardware.

According to some embodiments of the invention, the software product to be delivered to the device 16, is loaded in the management system 12 and then downloaded to the device 16. The software in the management system 12 can be provided by a third party software developer in the form of software appliances in a range of formats suitable for running on different virtual machines.

Set-Up Procedure and Preliminary Configuration

For the purpose of delivering the software to the device 16, a method is provided of securely connecting the device 16 to the management system 12 via the network 15 prior to delivery thereof and this can be an automated process. Although the connection is preferably secure, it may be intermittent or unreliable in the sense that the management system 12 may not be in control of the reliability of the network on which the device 16 is located.

After the installation of a secure connection between the device 16 and the management system 12, different types of information can be sent to the management system 12 via the secure connection. This information includes an identity of the user or other client entity provided with the device 16, hardware information regarding the device 16 or information regarding the client entity connected to the management system 12, and information regarding the settings of the network 15. The identity of the client can be a contact address such as an email. According to one aspect, an email address containing data is sent to the user or client entity.

Subsequently, the reception of this information by the management system 12 causes the initiation of a preliminary configuration step for installation of the software.

The preliminary step of the configuration comprises sending a message to the client address or the user address. The message sent to the client or user's address can for example be an email. The message sent to the client or user contains data providing linkage to a configuration interface. For example, the message may contain a web link through which the client or user will be directed to a configuration interface such as a web page for configuration through which the client or user is able to provide additional information.

Configuration

Furthermore, a configuration means is provided through which the user is offered to supply configuration settings suitable for working the software product. Some default values for setting network parameters, web parameters (URL), may be suggested by the software provider to facilitate configuration of the software. This will be described in more detail later.

Such additional information enables the installation on the data processing device 16 of the device agent 19, the support software of the device agent 19, the security keys of the device 16, and/or the settings of the device 16. According to one aspect, after the aforementioned components have been installed on the device 16, the hardware of the device 16 is restarted with the new software. Subsequently, the hardware of the device 16 is ready to have virtual machines containing the software applications installed. After the preliminary step, the user is able to select from a list of products, which software products are to be installed in the respective virtual machine of the device 16 or in a multiple virtual machines.

Delivery of the Software to the Device

Once some or all of the configuration information has been provided by the client through the assistance of a third party software provider and/or a party managing the management system 12, the appropriate software is downloaded to the device 16. The download may begin before all the configuration information has been provided as the download can occur in stages with the initial stage relating to standard settings relating to the product which will apply to most data processing devices and the final stage being updated configuration settings relevant to that particular device.

It will be apparent to a person skilled in the art that the software products can be provided for the client or the user under a range of payments models. Such models include payments before delivery of the software or offering the software free of charge for a trial period before the actual payment is made by the client. The software is particularly applicable to server type software that needs only storage and networking resources, but it can also be used with desktop software where a screen, keyboard and other peripherals may be needed.

Installing the Software on the Device

The appropriate software is delivered on one or more of the virtual machines 21, 22, 23, 24 of the device 16.

Running the Software on the Device

The software or the software product is started within a virtual machine 21. Advantageously, each software product can be run on a respective virtual machine. Once the software product is started within a virtual machine, it is available for use by the user. Therefore, it is possible for different products provided by different software providers to be run independently of each other on the same physical device 16.

In order to support a user in their usage of the software delivered, a monitoring facility is provided.

Monitoring Facility

A supplier, such as a hardware supplier of the devices 16, 17, 18, can monitor characteristics of the software and/or the hardware. For example, parameters relating to the health of the hardware such as disk status, redundant array of independent disks ("RAID") array, central processing unit temperature by, for example, detecting changes in the processor fan speed etc. can be monitored in order to have the hardware supplier receive a notification alerting them of an unordinary event. For example, disk health monitoring may be carried out, and on detection of a problem, a notification may be sent to a monitoring server. Although a single supplier is normally responsible for monitoring, of course, several hardware suppliers may be receiving notification as the result of monitoring the hardware.

Reliability

The management system 12 can constantly monitor the virtual machines 21, 22, 23, 24 and therefore check if the virtual machines 21, 22, 23, 24 are running correctly. The monitoring information including reliability statistics are recorded and can be reused in alerting a third party should a failure occur. Monitoring advantageously provides reliability. For further reliability and fault tolerance, a backup system is provided. A data storage area of the device 16 which may be provided one or more sections of the hard drives 28,29 can be made available on the local network 26, 27. Moreover, the system facilitates off-site backup of the user's data between two file or database servers within the network, the file server and/or database server in the device 16 being provided by virtual machine 24. The system advantageously establishes a secure direct connection between two data processing devices that the servers run on, and then performs a regular backup over said connection between the two servers.

Control Access by a Third Party

The client or the user is capable, if he wishes so, to provide a third party with access to his device 16 and virtual machines 21, 22, 23, 24. Third party access can for example enable the software developer to upgrade the software it had provided to the user device 16 when such upgrades are needed. The previous example is not limiting and of course other activities may be carried out by a software provider as will be understood by a person skilled in the art.

The management system 12 may record all accesses made to the virtual machines 21, 22, 23, 24. Such records can include information relating to third parties accessing said virtual machines 21, 22, 23, 24. Thereafter, the client is able to obtain information from the records relating to the third parties who have accessed their device's virtual machines. The client will, for example, be able to obtain various types of information such as which third party software provider accessed their device, the type of access (e.g. server access reboot, shutdown), the time of said access, and/or the reasons for such an access.

Integrated, Distributed Monitoring

An integrated, distributed method of monitoring the virtual machines 21, 22, 23, 24 and the device hardware will now be described.

Figure 3:
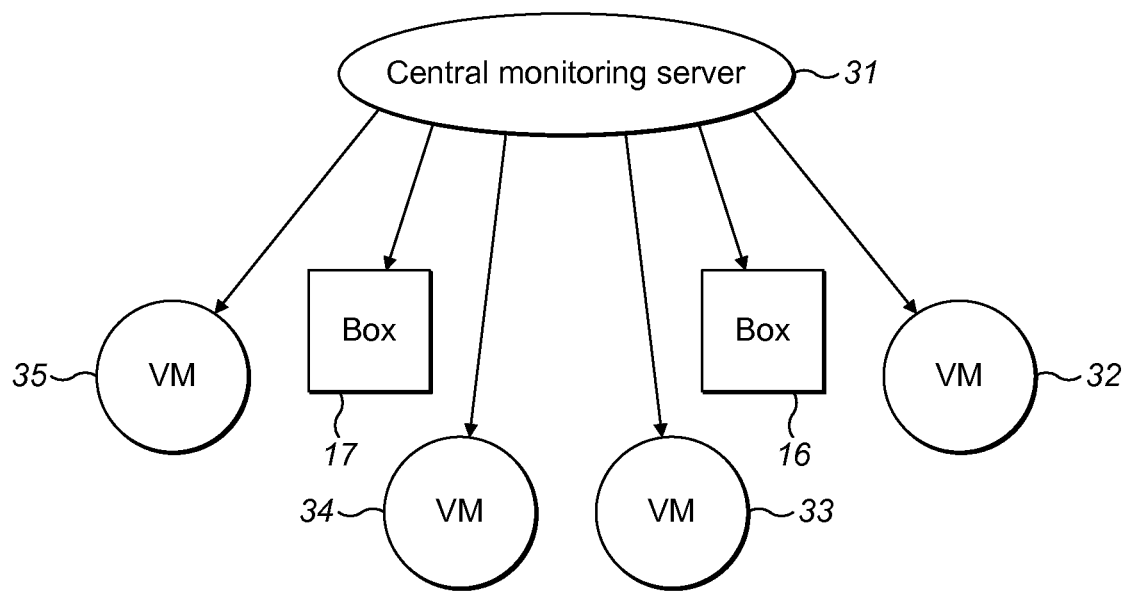
FIG. 3 shows a typical monitoring architecture.

Monitoring can involve a centralized server that regularly sends state determination requests to virtual machines on devices to obtain state information thereof. However the load incurred by such centralized monitoring system increases rapidly with a large number of virtual machines and devices. Additional problems occur in an environment in which there are frequent connectivity issues. In such an environment, several status requests sent to virtual machines or devices which are unreachable at the moment of the requests remain unanswered. FIG. 3 depicts an example of such a system.

Figure 4:
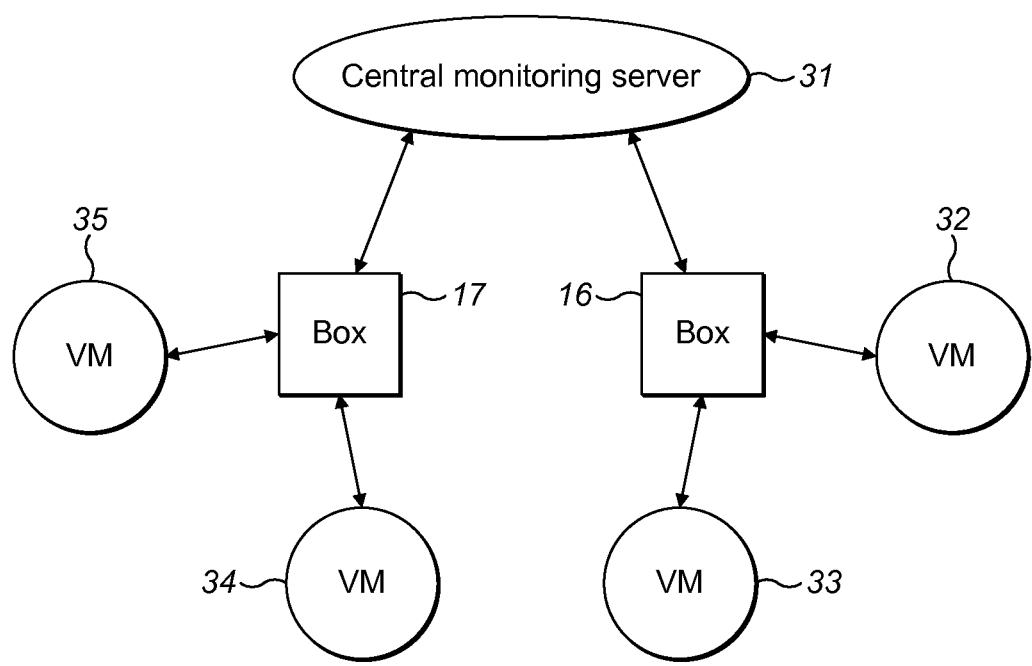
FIG. 4 shows an integrated, distributed monitoring architecture according to an embodiment of the invention.

FIG. 4 shows an architecture that can alleviate the drawbacks of the system described with reference to FIG. 3. The architecture comprises a central monitoring server 31 as shown in FIG. 4 in which monitoring activity is delegated to data processing devices 16, 17. The data processing devices 16, 17 may each be situated at different sites or locations and multiple data processing devices may be provided at each location. Monitoring activity is advantageously delegated to data processing devices 16,17 which have good connectivity to the virtual machines 32,33,34,35. According to embodiments of the present invention, the device agent can monitor the states of the virtual machines. The device agent of a data processing device regularly, e.g. every minute, requests information relating to the state of each virtual machine it is responsible for, and incorporates the respective information in a bundle. The device agent then sends the aggregated information inside a single package to the central monitoring server. Subsequently, the device agent repeats the same operation at regular interval of time, e.g. every minute. This architecture advantageously transfers the load for monitoring the virtual machines from the central monitoring server 31 to the data processing device 16. When there is a connectivity problem between the data processing device and the central management system which includes the central monitoring server 31, the processes that are blocked are the ones running on the device 16 and the processes running on the central monitoring server 31 remain unaffected by the network connectivity problem.

Virtual machines 32,33,34,35 of this figure have similar functionality to the virtual machines shown in FIG. 2. Information relating to the state of each virtual machine form monitoring results. The monitoring results hence obtained are stored on the monitoring server 31. The monitoring results may additionally be stored on the data processing device 16, for example by means of the device agent 19. The central monitoring server 31 can store said results in a dataset, e.g. a database, together with the time at which said monitoring results were received. This storage advantageously permits connectivity loss to be detected by scanning the database for devices that have not reported their states for a period of time, e.g. 2 minutes.

In another embodiment, the device agent 19 records the previous state of the virtual machines and only sends information about changes to the monitoring states since the last transmission thereof. This substantially reduces network traffic and processing load on the central monitoring server 31. In this embodiment, when a connection fails between the device 16 and the central monitoring server 31, the device agent keeps recording events and eventually, when connectivity is restored all the changes are sent to the central monitoring server 31. This technique advantageously allows the virtual machines to be accurately monitored even when the connection to the central monitoring server 31 is temporarily broken. If no state has changed within a monitoring interval, then the device agent 16 sends an explicit notification indicating that no change had occurred so that the central monitoring server 31 knows that it is still in contact with the device 16.

In another embodiment, for the purpose of monitoring, instead of sending a batch or package of changes at regular intervals of time, the changes that occur on the virtual machine are sent immediately, whenever they occur, to the central monitoring server 31. This technique advantageously avoids long time intervals before an event is reported to the central monitoring server 31. For example, when batching up the changes and sending them at an interval of 1 minute, in a worst case scenario, it could take two minutes between the time of occurrence of an error and the time at which the central monitoring system 31 becomes aware of it. This is highly undesirable. In this embodiment, if the changes are not sent, then the device agent 19 of the device 16 will try to resend them on a regular basis. Moreover if there is no change for a period of time, regular explicit notification indicating no change is sent on a regular basis. In this embodiment, the notification time is reduced at the cost of an increase in transmission frequency. It is however noted that the increase in transmission and therefore of the load on the central monitoring server is due to smaller notification messages or packets.

In another embodiment, for the purpose of monitoring, an agent on the virtual machine called the "virtual machine agent" (not shown) is introduced to interact with the device agent 19 in a way similar to the way in which the device agent 19 interacts with the central monitoring server 31. The virtual machine agent contacts the device agent 19 immediately on a change to the virtual machine agent's status instead of having the server's status being regularly requested by the device agent 19. This reduces the load on the device agent 19 and further reduces the notification time (typically by 30 seconds to one minute). The software may have the virtual machine agent built into it, and the device agent 19 will be aware of this (through the virtual machine details supplied by the central management system).

Normally monitoring servers are standalone systems. However, in this case the device agent is responsible for stopping & starting the virtual machines as well as monitoring the state of the virtual machines once they are running. This integration makes it possible to record and report not only the state of the virtual machines once they are running, but also when they are stopping, stopped, starting and other in states that are normally outside the scope of a monitoring system. Integration with the virtual machine agent allows it to notify the device agent at the end of the virtual machine's boot process, ensuring that the monitoring system accurately knows when a virtual machine has transitioned into a running state, ensuring that the virtual machine isn't monitored too early or too late. This also allows the central monitoring system to request that monitoring tests be run immediately for the device or virtual machines that are of particular interest to a user, avoiding the normal one minute delay on monitoring updates.

The virtual machine agent and the device monitor, may produce monitoring report messages in two formats. The message in the first format is used when details of the monitoring report are stored in the historical record and to determine whether the state of the monitoring alert has changed. The message in the second format holds more immediate detail and is displayed to a user investigating a monitoring report, to give instantaneous information about the report. For example if a RAID array is degraded, but is rebuilding, the message in the first format might be "RAID Array degraded, rebuilding" while the message in the second format might be "RAID Array degraded, rebuilding, 33% complete". This second message enables real time status information to be available to the monitoring server 31 or on the device 16, such information being useful at the time of the rebuild but no longer useful after the rebuild is complete. The first message can be held separately from the second message, and this will avoid complications with the historical log of the array rebuild. Information relating the monitoring state may be shown on a console of the device 16,17.

For each of the above embodiments referred to with reference to FIG. 4, the device 17 also has similar functionality to the device 16 but the description relating to its functionality is not repeated for brevity.

Connecting the Device to the Core Management System

Figure 5:
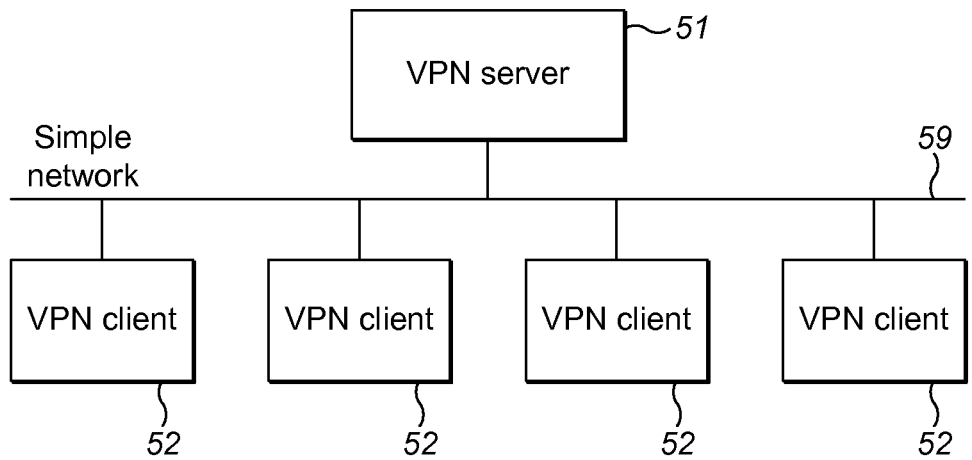
FIG. 5 shows an ideal network topology for a VPN.
Figure 6:
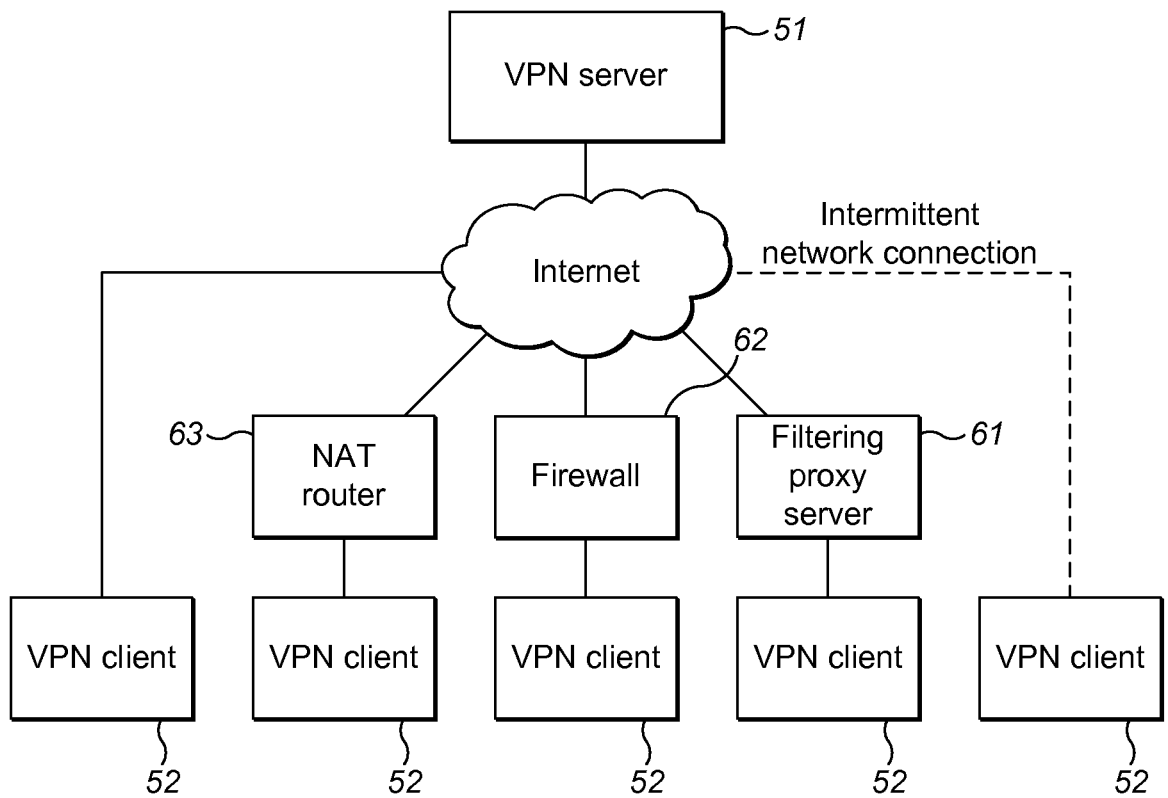
FIG. 6 shows a realistic architecture used for establishing a VPN connection.

As already indicated above, prior to controlling a device 16 there should be a secure connection between the device 16 and the central management system 12. This is preferably done through the use of virtual private network (VPN) technology that encrypts the traffic and reliably authenticates the device 16 to the central management server 12. FIG. 5 illustrates schematically a first network architecture wherein a VPN server 51 is connected via a network 59 to one or more VPN clients 52. Where the device is directly connected to the internet, this is a straightforward operation. However in many cases the devices are not directly connected to the Internet. FIG. 6 illustrates such architecture in which the VPN client 52 is located behind a network address translation (NAT) router 63 or a Firewall 62 or a Filtering proxy server 61. In such an architecture, various techniques are provided to establish a reliable connection between the device 16 and the core management system 12.

The VPN technology is appropriate for securing traffic, but often makes overly simplistic assumptions about the nature of the network between the two ends of the VPN and the establishment of the connection between the two ends. Specifically, it may assume that a simple IP network exists when this may not be the case. It might be possible to establish a connection between these two points, but in some cases the VPN software is not sophisticated enough to make use of the connectivity available. In such cases the VPN software will expect the end user to adapt their firewall, proxy server etc. to allow the VPN traffic to go through. However this requires the end user to have a technical knowledge regarding access to the firewall, proxy server, NAT etc. in order for him to make the necessary changes. This manual intervention is time demanding and requires a set of skills to achieve the appropriate diagnostics and get the changes right.

Figure 7:
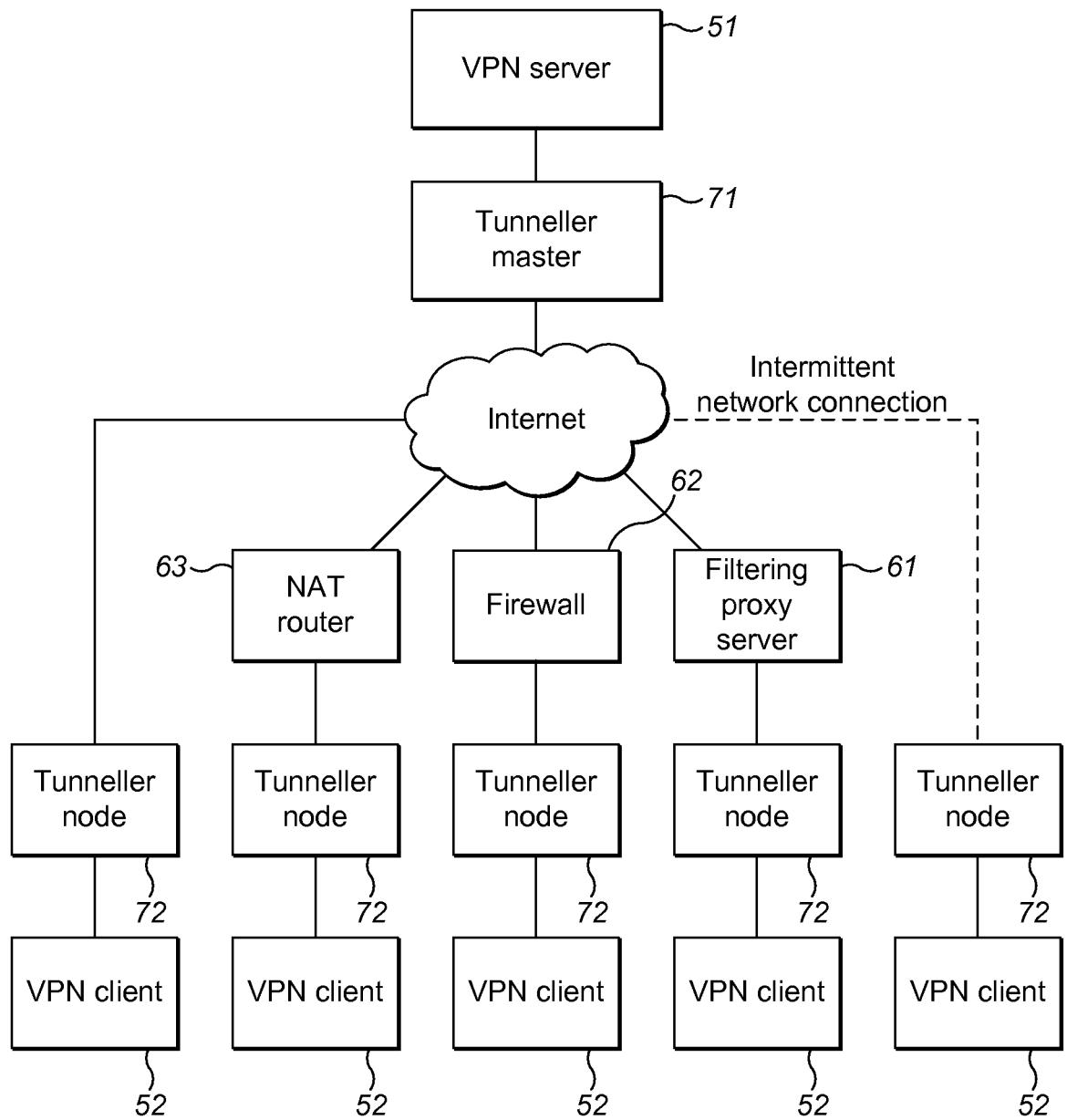
FIG. 7 schematically illustrates an architecture according to an embodiment of the invention with a tunneller between a VPN server and a VPN client.

The difficulties of establishing a VPN Connection from a client which is located in a private network behind a NAT or a Firewall or a Filtering proxy are known. Referring to FIG. 7, to address these difficulties, a new set of components are provided particularly a Tunneller Master 71 and a Tunneller Node 72 to further facilitate the establishment of the VPN connection between a data processing device in which a VPN client 52 is located and a central management system in which the VPN server 51 is located when the VPN client is not directly connected to a standard address such as a global Internet Protocol address. The VPN server 51 may be within the management system but not on the central management server but close to it. The Tunneller Node 72 is located between the VPN client 52 and a NAT Router 63 and/or a Firewall 62 and/or a FilteringProxy server 61. A tunnel is a term used to identify the tunnel created between one Tunneller Node 72 and the Tunneller Master 71. A tunnel sits (is established) between the VPN server 51 and each of one or more VPN Clients 52. A variety of techniques can be used to establish the tunnel connection to a central address or a standard global internet address that is directly connected to the Internet. This connection from the node to the master might be a direct connection via a User Datagram Protocol (UDP), or via a Transport Control Protocol (TCP) on a range of ports. Alternatively, the tunnel connection may be an indirect TCP connection via a proxy server or if necessary could use techniques such as DNS tunneling. Tunneller preferably makes use of a more efficient transport such as the UDP transport protocol. The simpler techniques, e.g UDP are tried first, followed by other techniques when attempting to establish the tunnel connection. When first attempting a UDP connection without success, Tunneller then tries to establish a connection using other transports amongst the totality of available transports until a connection is successfully established. If connectivity cannot be established, then the nodes 72 keep trying on a regular basis. If connectivity is established, Tunneller presents a standard IP address to the device 16 allowing the VPN software to use the tunnelled connection as if it were a simple internet connection. Once the tunnel is established, the node 72 is issued a unique IP address and code by the Tunneller Master 71 and it assigns the IP address to a 'tun' network interface (explained later). Should connectivity be lost, the node 72 tries to re-establish connectivity, and when successfully re-established, it identifies itself again using the unique code issued earlier by the Tunneller Master 71. As additional transports are developed, supports for said transports are simply added to the master (that is the Tunneller Master 71) and the node (that is the Tunneller Node 72). The device 16, VPN client 52 and Tunneller Node 72 are preferably on the same operating system. With this arrangement, it possible for a standard VPN software to run over any transport of a wide range of transports. Moreover, as new transport techniques become available, no additional change is required to the VPN software or the nodes that are already deployed for supporting said additional transports.

As will be appreciated by one skilled in the art, the Tunneller network is unsecure. However, by running the VPN software over the Tunneller network, and ensuring that all traffic is routed through the VPN the desired level of security is achieved.

An implementation example for achieving a tunnel is highlighted in the following: Tunneller works by having a Tunneller master 71 in the form of an application directly connected to the internet and nodes 72 in the form of software on each of the devices which include VPN software clients 52. The master and node software both use a technique known as the tun/tap interface on Linux which allows it to create a virtual network interface which appears to the networking software on the device as a normal IP network interface. In fact, all packets to and from the interface are passed through the software application. This allows the tunneller network to appear to the VPN software as a standard IP network. The nodes 72 and tunneller master 71 then work to establish a connection and pass the VPN packets received to each other.

Facilitated Secure Distributed Networking

For facilitating distribution of the software in a secure way, the network created by Tunneller is a star network which means that it is formed by one central node and several leaf nodes, wherein all leaf nodes are connected to the one central node. In such created star topology, the data processing devices 16, 17, 18 are the leaf nodes and communicate with the master node which is part of the management system 12. As will be apparent to a person skilled in the art, the leaf nodes or the devices of the created star topology are unable to communicate directly with each other.

It is desirable to allow virtual machines (not the actual physical data processing devices) to talk directly to each other, for example to perform off site backups or access a service provided by a virtual machine that is managed by the system, but at a different physical location.

According to one embodiment, the plurality of data processing devices can be grouped in different sites, such that the devices of a given site are all connected to the same network and all virtual machines of devices in a given site are also grouped in the site. In such a configuration, every site is attributed a unique network address range by the management system, and each device and each virtual machine in the site is given a unique address within said address range. Moreover, one device is elected in each site as a gateway box for routing traffic coming to said site and leaving said site. The traffic destined to or originated from a node having an address that falls within the range of the set of addresses allocated to the given site is transmitted through the gateway of that site and the central management system.

Figure 8:
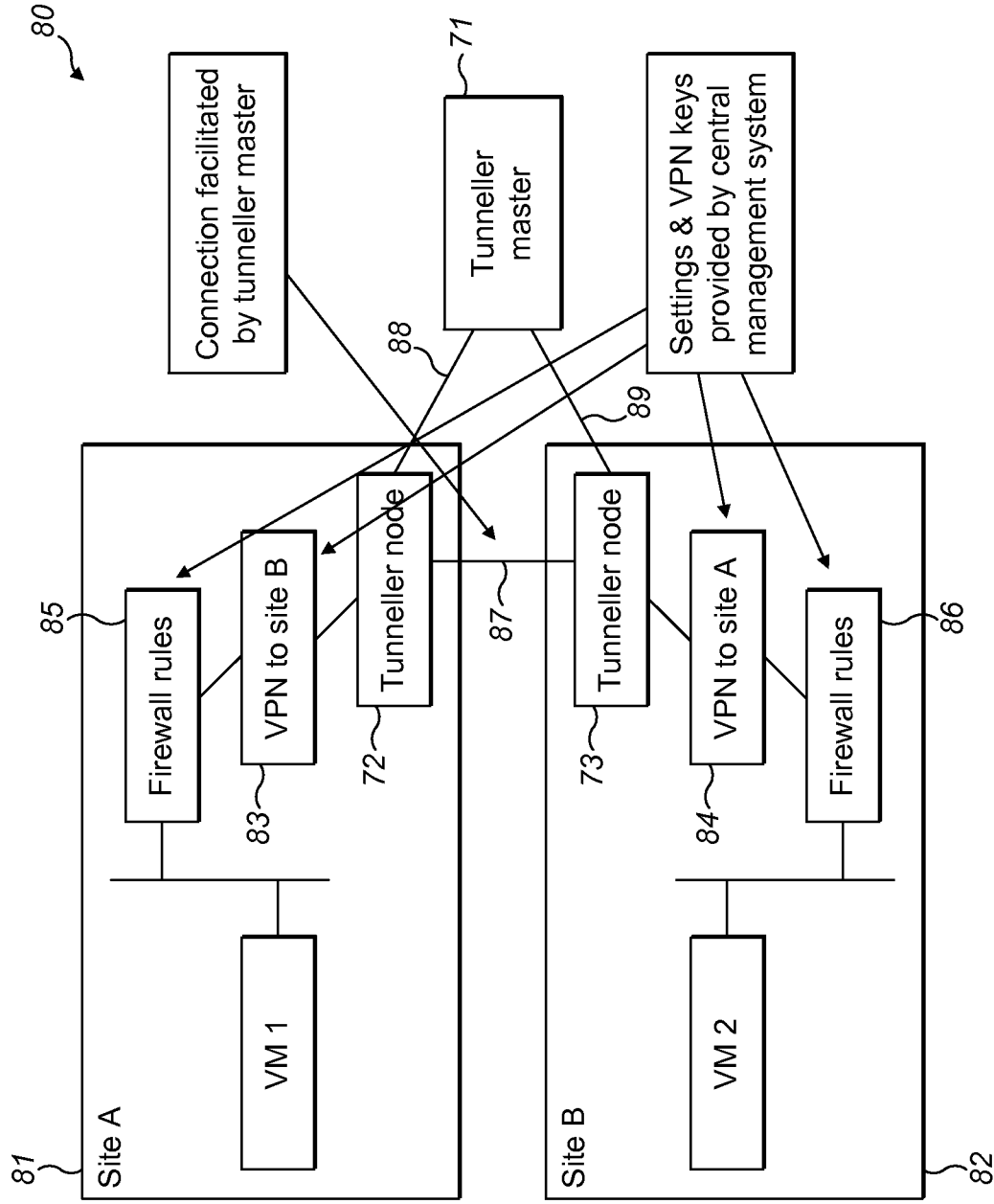
FIG. 8 depicts two communicating sites connected through respective tunneller nodes, and a tunneller master that facilitates the connection.

As illustrated in FIG. 8, when two virtual machines at different sites (site A and site B) need to communicate directly, Tunneller master 71 which forms part of the central management system 71 instructs the respective gateway at each of the two sites A, B to establish a direct connection between them. For that purpose, the management system instructs the respective Tunneller nodes 72, 73 to establish a direct network connection. The data processing device at each site is located at the respective tunneller node. This direct network connection is achieved by the Tunneller master node 71 determining the nature of the device node's connection to the internet and facilitating the connection if possible in a similar way to a Session Traversal Utilities for NAT server or STUN server. This could be achieved by carrying out various tests on the network such as probing the network connection and then deducing how the network is configured on the basis of these tests. It is noted that the STUN protocol (specified in "Request for Comments 5389") provides a means for an endpoint to determine the IP address and port number allocated by a NAT that corresponds to its private IP address and port number. It also provides a way for an endpoint to keep a NAT binding alive. The STUN protocol can be used, when extended, to perform connectivity checks between two endpoints, or to relay packets between two endpoints. Depending upon the natures of the box node's connection to the internet, it may be possible to establish a direct connection automatically, but if not it can provide assistance and diagnostics to help the user or the client using the device.

Once the Tunneller connection has been established, the rest of the process can be performed automatically. The (central) management system issues the VPN keys to the gateway boxes to allow a VPN connection to be established between them, it gives details of routes to allow the correct routes to be added on the gateway boxes, and it gives details of which virtual machines are talking to each other so that firewall rules can be set up to prevent traffic between un-authorized virtual machines.

Resources Access and Assisted Integration

In some cases a virtual machine can run in isolation, but it many cases it is necessary for the software running within the virtual machine to access resources managed by other virtual machines, or integrate with software applications running on other virtual machines. Managing these resources and the integration between two applications is normally a manual process requiring a fair amount of technical knowledge. With the aforementioned system, it is possible to automate the process of integrating two applications running on separate virtual machines within the system, speeding up the process, making it more reliable and simplifying it to allow a non-technical user to perform it.

Centrally Managed, Secure Desktop Computing

In today's workplace, system administrators are often faced with the major problem of managing and securing large numbers of desktop computers. A typical solution to this problem is to load software onto a computer to provide remote administration and security. Such software typically runs under the desktop operating system meaning that it only works if the desktop operating system is running correctly and makes it accessible to other software running on the computer. This means that if the desktop operating system crashes or has a serious problem it can no longer be accessed remotely, and the software can be interfered with either accidentally or maliciously by other software applications running on the computer.

Figure 9:
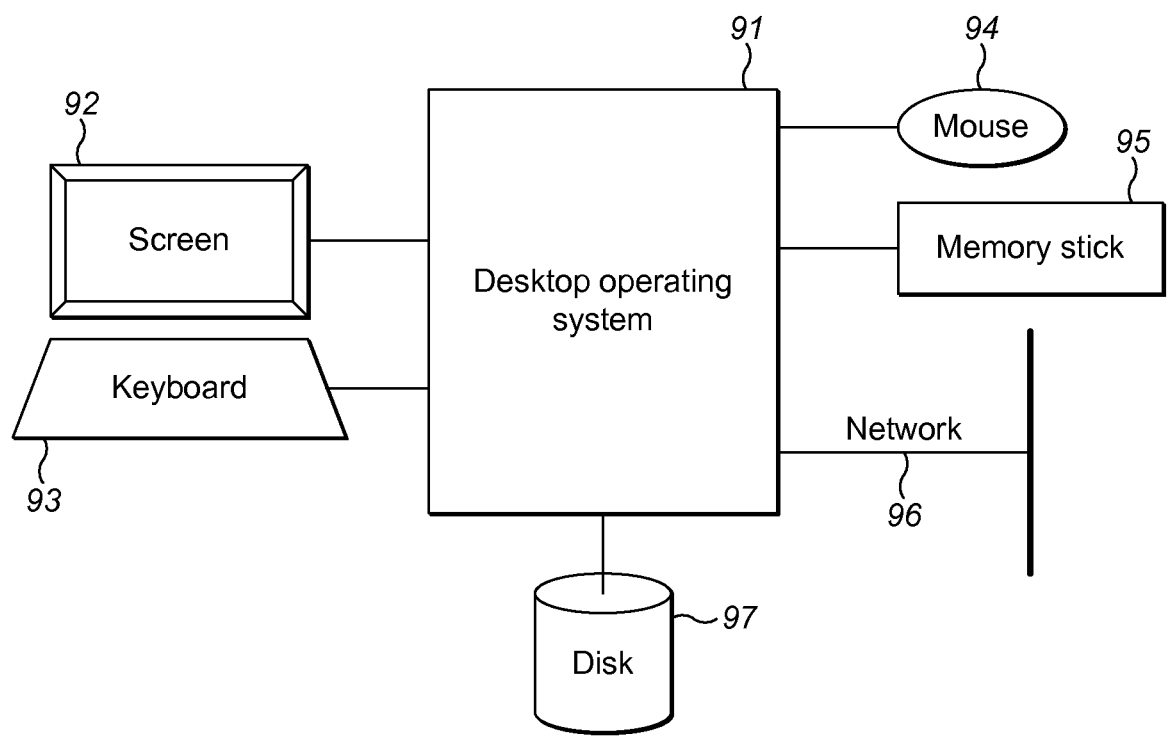
FIG. 9 schematically illustrates a computer with a desktop operating system.

FIG. 9 illustrates a data processing device comprising a desktop operating system 91, a screen 92, a keyboard 93, a mouse 94, a memory stick 95 and a disk 97. The device is further connected to a network by means of a network connection 96.

The central management system 12 controls the software running on the data processing devices. The device can be any type of computing device that may be located in a network that can be accessed by the central management system 12 and the different devices may not be on the same network as each other. As already indicated above, each device is capable of creating at least one virtual machine. The or each virtual machine can run the operating system 91 and/or respective application software. As indicated above, each device having several virtual machines is capable of connecting to the management system 12. Thereafter, the management system 12 controls the respective software by for example providing updates and changes thereof. When the connection needed for monitoring between the device and the management system 12 is broken, the virtual machines and device will continue to function.

The virtual machines are self-contained environments in which the operating system 91 and application software run isolated from other virtual machines on the same hardware. Device software which can be provided in addition to the device agent 19 of FIG. 2 controls the virtual machines and is provided between the peripheral devices and the virtual machines, and can choose what peripheral devices a virtual machine has access to. The device software can also actively process data as it is passed between peripheral devices and the virtual machines, allowing it to filter or translate the data.

Figure 10:
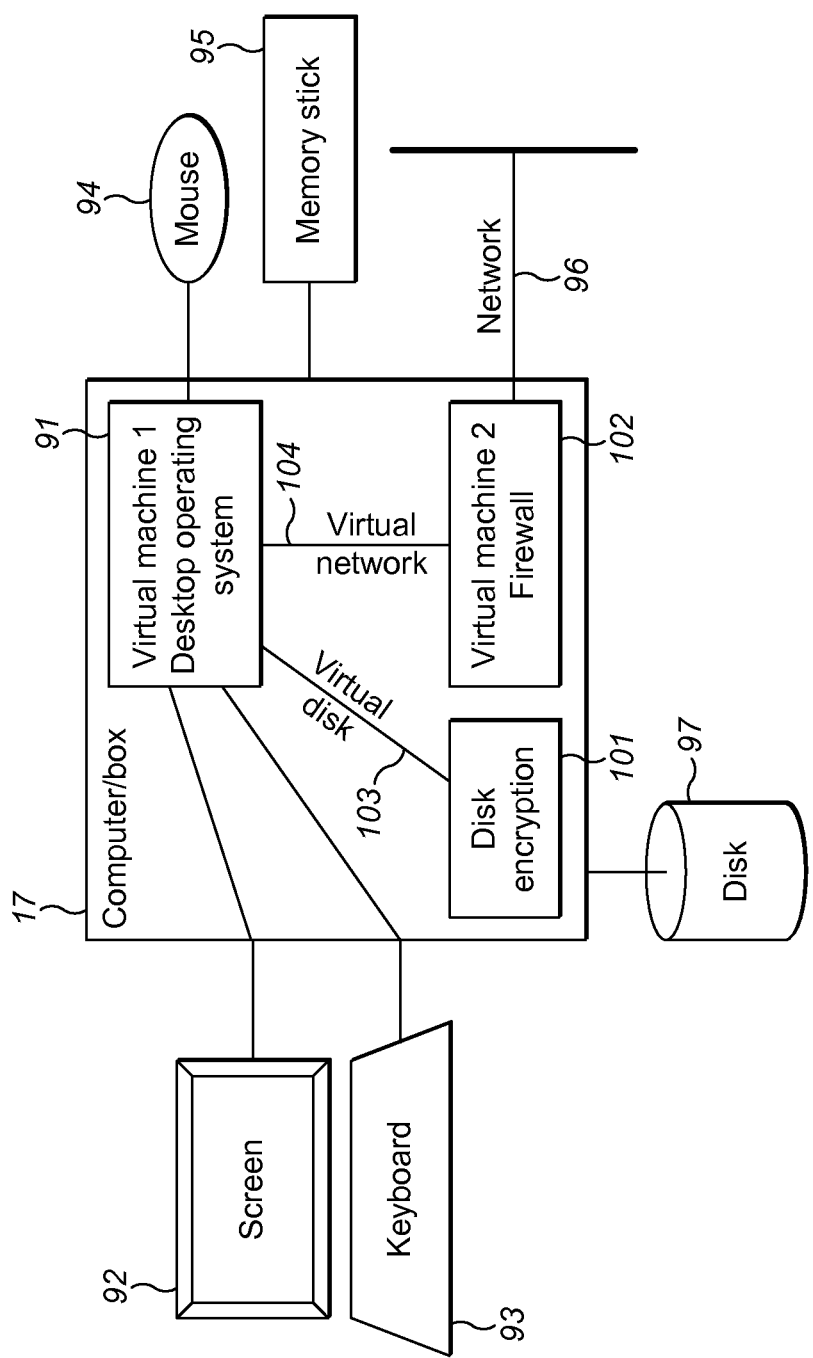
FIG. 10, shows a desktop operating system run within a virtual machine on a computer device according to an embodiment of the invention where additional software run outside of the desktop domain controls the desktop access to devices.

As illustrated in FIG. 10, a desktop environment is run within a virtual machine 91 on the data processing device 17, and given access to the video card, the keyboard 93, the mouse 94 and the sound card. It is also given access to a virtual network interface 104 and a virtual hard disk 103, so that from the virtual machine's perspective it has access to all the resources it normally needs. By having direct access to the video and sound cards it is able to make full use of these devices, for example being able to render high quality 3D graphics, and ensuring that graphics and sound is correctly synchronized.

The device software is provided with encryption capability. Within the device software, data can be encrypted as it moves between the physical hard disk 97 and the virtual hard disk 103 so that only encrypted data is stored on the physical hard disk 97, while presenting a standard unencrypted virtual hard disk to the desktop environment 91.

It is possible to route network traffic from the physical network 96 interface through separate virtual machines 102 before it is passed to the virtual network interface 104. This is to provide more flexibility in routing the traffic. This second virtual machine 102 is given responsibility for firewalling the desktop's network traffic and can be controlled by a central system administrator. This allows a central system administrator to define a per-desktop firewalling policy, have that policy implemented by the computer itself and have confidence that the policy cannot be interfered with. This firewalling policy could be used to restrict users' access to certain services rather than giving them broad access to the corporate network. It can also be used to monitor network traffic to and from the desktop for unusual traffic patterns such as a worm/virus infection or a network penetration by external parties. The firewall might also be used to lock down a desktop to prevent propagation of a worm or virus from an infected desktop or to monitor the activity of an external party.

It is possible to include a VPN system within the firewall 102 allowing secure and reliable access to a corporate network when away from the office, or the ability to encrypt traffic within the corporate LAN to prevent eavesdropping. With such a VPN system within the firewall it is possible to allow the desktop operating system 91 to access a corporate network over a home or other external network, while simultaneously denying the desktop access to that network. The VPN runs within the stable environment of the firewall virtual machine 102 to which only the central system administrator has access, making it easier to manage, more secure and more reliable.

It is possible to filter devices on general purpose busses, such as USB devices. A systems administrator can for example allow the desktop access to USB peripherals such as mice 94, keyboards 93, but deny access to peripherals such as memory sticks 95, CD writers or network cards. Thus preventing a potential mechanism by which an employee could remove data from the company, and blocking a vector by which malicious software can enter a network.

To ensure that desktop environment is only accessed by authorized personnel, a security mechanism that may be in the form of a USB dongle/memory stick can be used to hold the security keys used by the device software and firewall. If an authorized dongle is inserted in the machine, the VPN and disk encryption keys are activated and the desktop environment is enabled. When the dongle is removed, the desktop is suspended, the VPN and disk encryption is disabled and any copies of the keys held by the computer are removed. Alternatively the keys can be protected by a user supplied password, some combination of these two systems, or some other such security system.

A further level of sophistication when managing removable media such as USB memory sticks for a desktop virtual machine is rather than simply blocking or allowing removable media, the data flow between the media and the desktop virtual machine can be processed, encrypting data as it is written to the media, and decrypting it as it is read from the media. This encryption can be done outside the scope of the desktop virtual machine ensuring that the user of the desktop virtual machine, and software running within the desktop virtual machine cannot interfere with this encryption process.

From the desktop virtual machine's perspective the removable media appears to be unencrypted, but if the media is placed in an unauthorized machine, the data on the media cannot be accessed.

By assigning an encryption key that is unique to each piece of removable media, and having a key management system with central key storage and control within an organisation, it is possible for data on removable media to be easily shared within an organisation, while making it much harder for data to leak out of the organisation on removable media. This also allows the movement of removable media to be tracked within the organisation. If it is necessary to transfer data to an external organisation, by sharing the media's key via a secure link with the external organisation they can access the contents of the removable media, while still securing the data against $3^{rd}$ parties.

Alternative Device Architecture

Figure 11:
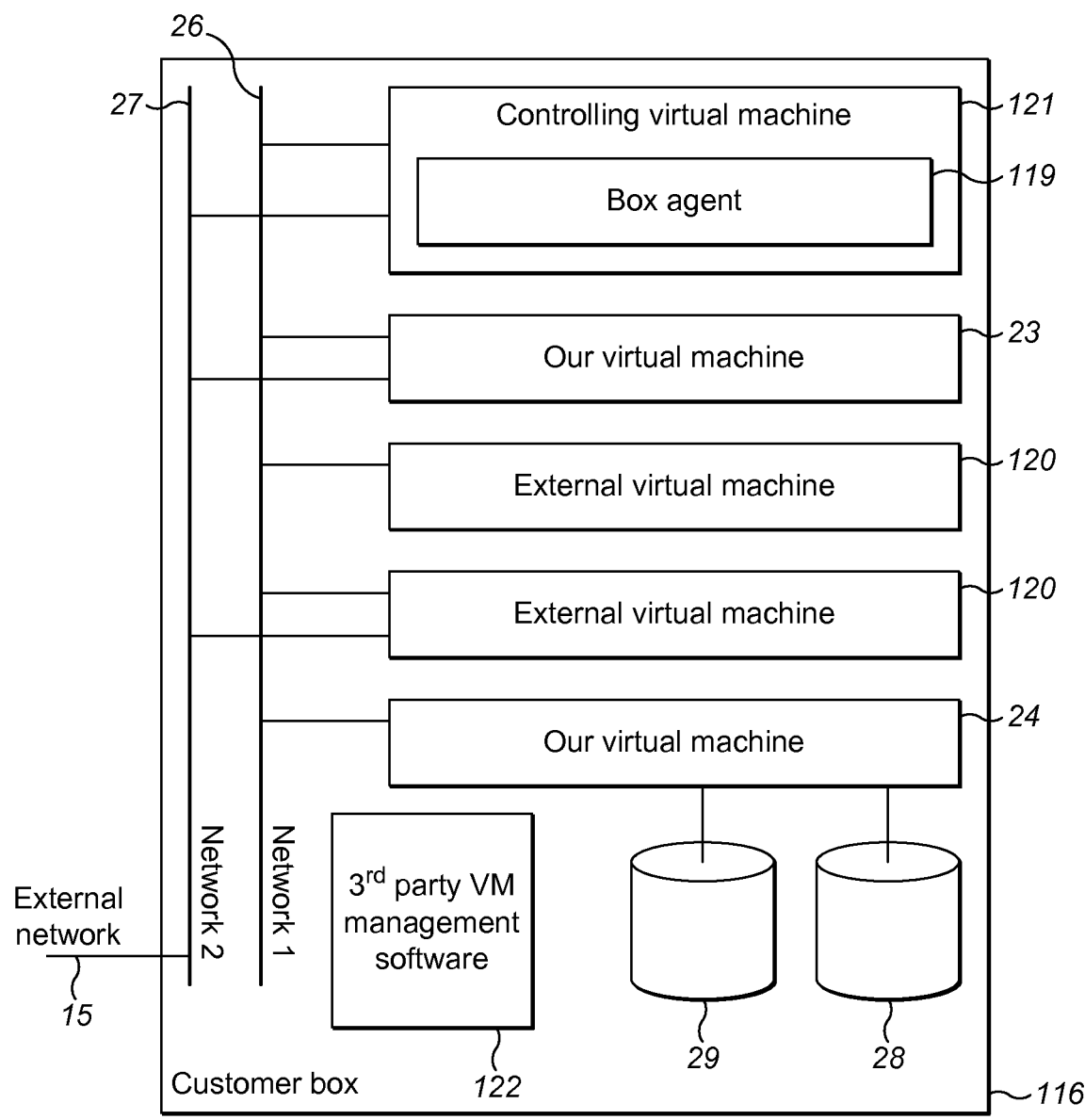
FIG. 11 shows a schematic representation of an alternative device architecture to that shown in FIG. 2.

In an alternative architecture to that shown in FIG. 2, the device architecture shown in FIG. 11 may be provided. In FIG. 2, the system is responsible for managing all aspects of the physical hardware, and controls all virtual machines running on that hardware. Device agent 19 has full control, constructing and starting/stopping virtual machines directly. In the alternative system of FIG. 11, the device agent is integrated with an existing virtual machine management system such as VMWare®, XenServer®, Hyper-V® or even the Amazon® Web Services cloud.

In the alternative architecture of FIG. 11, device 116 is provided in a similar location as device 16. Device agent 119 is software provided to the device 116 but unlike the device agent 19 of FIG. 2, is not responsible for the physical hardware. Virtual machines 120 from other sources can be run on the same hardware as virtual machines 23,24 provided with the device agent 119. This architecture is more appropriate where a range of virtual machines 120 are already provided and run on a device 116 within which the device agent 119 is to be provided and only some virtual machines 23,24 are to be supplied with the device agent 119. This type of architecture is appropriate where a whole physical machine is not to be provided which is different to the architecture in FIG. 2 where a machine in the form of device 16 is provided.

In this embodiment, the device agent 119 which controls virtual machines 23, 24 is run within its own controlling virtual machine 121, and given access through a secure network based API to the 3$^{rd}$ party VM management system 122. In this case, rather than starting virtual machines directly, device agent 119 requests the VM management system 122 to construct and run virtual machines on its behalf.

It would be normal for the controlling virtual machine 121 to be run as a virtual machine controlled by the VM management system, but it could be run at any point with a good network connection to the Virtual Machine that it creates and the VM management system.

Simplified Network Configuration

As mentioned above in the "Configuration" section, some default values for network configuration may be suggested by the software provider. An example of the type of values and how they are derived is now explained.

Should a virtual machine such as that shown in FIG. 2 or 11 need to be connected to the local network, it will need configuration settings appropriate to the network that it is connected to. For virtual machines that do not need a fixed network address, these settings can be determined automatically if the network has a DHCP server. However for virtual machines that need a fixed network address (i.e. servers) or where there is no DHCP server, network settings have to be provided manually for each network that the virtual machine connects to. For servers, it is also normal to associate a DNS address with the server's numeric IP address, so that users can reach the server using a human readable URL rather than the numeric IP address. Again, setting up this mapping from DNS address to a fixed network address is normally a manual process.

A central management system 12 that controls the network settings of every virtual machine is provided as described above with reference to FIG. 1. Also a device agent 19, 119 is provided that is connected to the local network(s). This enables sensible default values for all the network settings to be provided, simplifying the process of setting up a server virtual machine.

Figure 12A:
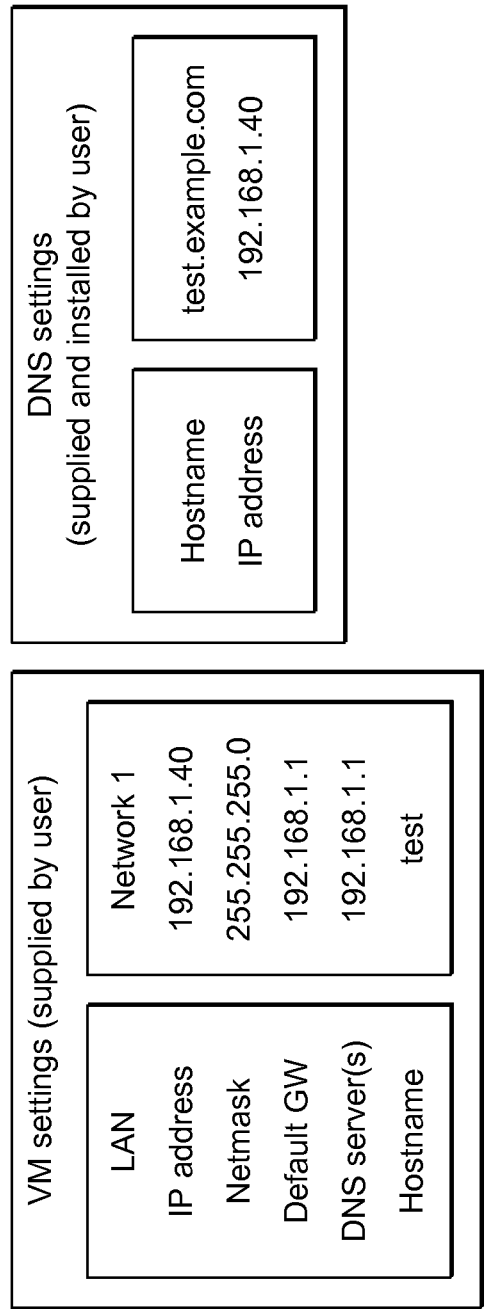
FIG. 12A shows an example of standard network configuration settings and FIG. 12B shows network configuration settings in an embodiment of the invention.

Normally a server virtual machine needs to be configured to connect to the correct LAN, be supplied an IP address, netmask, default gateway & DNS servers, and have its DNS address associated with the server's IP address. This configuration needs to be supplied for each network on each virtual machine. Typical standard network configuration settings are shown in FIG. 12A.

In some embodiments of the invention, a subnet structure is provided which has a network address range, netmask, an optional default gateway, zero or more DNS servers and is associated with a LAN. For every virtual machine that connects to the subnet, these settings are the same. Thus by identifying the correct subnet, and supplying a unique IP address, the correct network settings can be supplied to the virtual machine. As part of the device 16,17,18 setup process, a default LAN and default subnet are constructed based on the network settings that are used to contact the management system 12 during the Set-up Procedure.

To help determine an appropriate unique IP address, the device agent 19,119 regularly scans the local network looking for IP addresses that are unused. This list of unused IP addresses is made available to the central management system 12, so that when a user has to provide a unique IP address, they can have the option of choosing from a list of unused addresses. The virtual machines as part of their regular monitoring checks can also check whether they are the only device on the network with their IP address to ensure that their IP address remains unique.

Figure 12B:
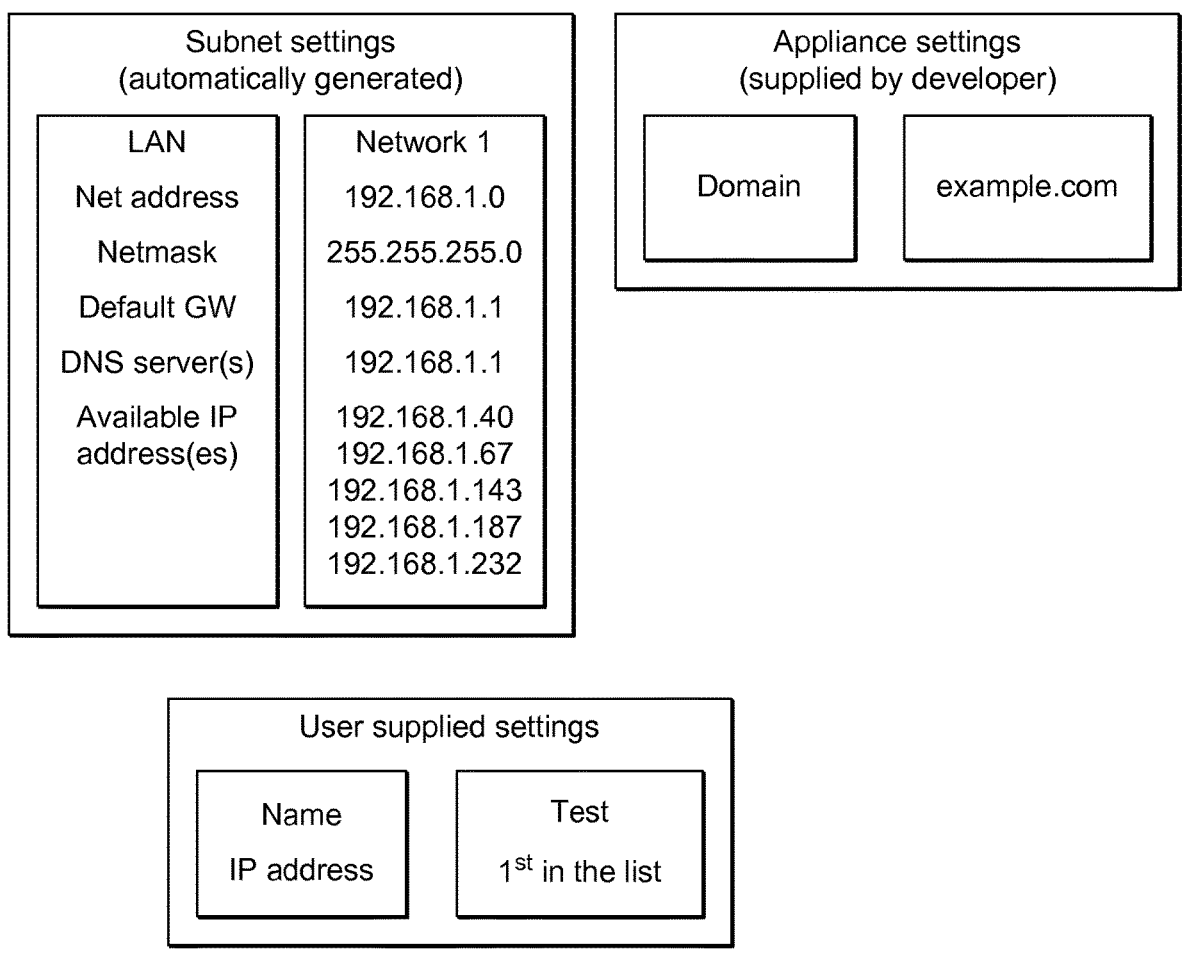

Finally, we allow a DNS domain to be associated with a software appliance, and for domain names within that domain to be automatically associated with an IP address. If such an association has been made for the appliance, when a new virtual machine in constructed, the management system 12 automatically generates a domain name based on the name given to the virtual machine by the user, and the domain associated with the virtual machine's appliance. This domain name is associated with the unique IP address that has been designed as the primary IP address for the virtual machine, and this association is automatically published through the DNS system. Typical network configuration settings that may be provided in an embodiment of the invention are shown in FIG. 12B.

Thus instead of supplying the netmask, default gateway, DNS servers and LAN name, the user simply selects the correct subnet and since there is normally only one subnet (the one automatically created at setup), this can be done automatically in most cases. With the subnet chosen, the user needs to supply a unique IP address for that subnet, but with the procedure of this embodiment, a user can select from a list of suitable addresses, rather than having to determine one themselves. Should that address become inappropriate, the virtual machine will detect it and report it as part of its normal monitoring. Finally a DNS address is automatically generated based on the virtual machine's name and the domain associated with the appliance, and is automatically associated with the virtual machine's IP address and published on the domain's name servers.

This means that in most cases, all that is required is for the user to choose a name for the server and select an IP address from a list of valid addresses which simplifies the procedure that would otherwise be required.

All or part of the operations described above can be carried out by virtue of a computer program including appropriate code instructions. This program can be loaded and run on computer means of a data processing device, e.g. a standalone box, or a plurality of such devices.

In addition to the embodiments of the invention described in detail above, the skilled person will recognize that various of the features described herein can be modified and/or combined with additional features, and the resulting additional embodiments of the invention are also within the scope of the accompanying claims.

The invention claimed is:

1. A method of monitoring a computer apparatus by a management system via a network, the method comprising:
   establishing a secure connection between the computer apparatus and the management system via the network, the computer apparatus comprising a plurality of hardware components, the computer apparatus being located at a first location and the management system being located at a second location remote from the first location;
   installing a controller on the computer apparatus;
   creating on the computer apparatus a virtual machine;
   monitoring, by the controller, a state of the virtual machine and a characteristic of the computer apparatus, wherein the characteristic includes information relating to the plurality of hardware components;
   notifying, by a virtual machine agent running on the virtual machine, the controller when the state of the virtual machine is changed;
   in response to notifying, sending, by the virtual machine agent, a monitoring report containing state information indicative of the state of the virtual machine to the controller;
   generating, by the controller, monitoring results containing the state information and the characteristic of the computer apparatus;
   reporting, by the controller, the monitoring results to the remote management system using the secure connection established via the network.

2. The method of claim 1, wherein the network connection is unreliable or intermittent.

3. The method of claim 1, further comprising downloading one or more computer programs on the computer apparatus via the connection and loading, installing and running said one or more computer programs on one of the virtual machine.

4. The method of claim 1, wherein the characteristic of the computer apparatus includes the state of one or more programs running within the virtual machine.

5. The method of claim 4, wherein the computer apparatus comprises a plurality of virtual machines and, wherein the one or more programs includes an operating system and/or application software and/or a software component, and the one or more programs are provided on the management system for installing on one of the plurality of virtual machines.

6. The method of claim 1, wherein the secure connection is used to transport information on the computer apparatus and an address of a user of said computer apparatus to the management system; and wherein a message is created and sent to the address of the user for enabling the user to provide further information including one or more of: supported software, security keys, settings of the computer apparatus, related to the computer apparatus for installation of the software on the computer apparatus.

7. The method of claim 1, wherein the computer apparatus includes a plurality of virtual machines, wherein the plurality of virtual machines of the computer apparatus are independent of each other and wherein, when one or more computer programs are run on different virtual machines of the same computer apparatus, each of the one or more computer programs run independently on the respective virtual machine.

8. The method of claim 7, wherein the computer programs are provided by different software providers.

9. The method of claim 3, wherein the method further comprises preliminary acts of configuration of the computer apparatus prior to downloading the one or more computer programs to the computer apparatus and the acts of configuration provide parameters or information required to manage the one or more computer programs.

10. The method of claim 1, wherein the hardware components are provided by at least one hardware provider.

11. The method of claim 10, wherein the computer apparatus hardware components comprise at least one disk and a central processing unit and, wherein the computer hardware information includes temperature of the central processing unit and/or a status of the at least one disk and, wherein monitoring the characteristic of the computer apparatus includes:
    comparing the temperature of the central processing unit with a reference value and reporting if the difference between the temperature and the reference value exceeds a predetermined threshold value; and/or
    storing the status of the at least one disk.

12. The method of claim 11, wherein monitoring the characteristic of the computer apparatus includes recording information related to the computer apparatus, said information including the status of the at least one disk and/or the temperature of the central processing unit.

13. The method of claim 1, wherein the results of the monitoring are provided to a central monitoring server of the management system, and the controller which controls the virtual machine stores the monitoring results.

14. The method of claim 13, wherein the controller monitors the state of the virtual machine by:
    regularly requesting state information of the virtual machine; and
    appending said requested state information in a package, while storing previously requested state information in the package; and
    regularly transmitting said state information collected in the package to the central monitoring server.

15. The method of claim 13, wherein the controller monitors the state of the virtual machine by:
    regularly obtaining the state information of the virtual machine; and
    when a change of state occurs to the virtual machine, appending only a change-of-state information corresponding to the change of state of the virtual machine in a package, while holding the previously obtained change-of-state information; and
    regularly transmitting the change-of-state information collected in said package to the central monitoring server.

16. The method of claim 13, wherein the controller monitors the state of the virtual machine by:
    regularly obtaining the state information for the virtual machine, and if no change to said state information is obtained at expiry of a predetermined length of time after a first time, transmitting a notification of no change to the central monitoring server.

17. The method of claim 15, wherein the central monitoring server stores the state information and/or the change-of-state-information about the virtual machine, and the central monitoring server further stores time of reception of said information.

18. The method of claim 15, wherein the management system records the state information.

19. The method of claim 1, further comprising enabling access of said computer apparatus to a third party in response to the monitoring results for further management of the computer apparatus, when the monitoring results indicate a failure or abnormal operation of the computer apparatus.

20. The method of claim 19, wherein the third party is a software provider and/or a hardware provider and/or the management system.

21. The method of claim 1, further comprising backing up data stored on the computer apparatus for providing fault tolerance, wherein backing up includes regularly backing up user data stored on the apparatus to a server connected to the computer apparatus via a network for access by a user.

22. The method of claim 1, wherein the secure connection is established between a first address and a second address using virtual private network connection software and wherein the secure connection is a virtual private network connection protecting data with encryption and/or authentication and/or integrity protection.

23. The method of claim 22, wherein a tunnel is first established between a node associated with the computer apparatus and a master node associated with the management system, and thereafter the secure connection is established inside said tunnel such that the tunnel appears to the virtual private network connection software as a network address.

24. The method of claim 23, wherein the tunnel is established using a User Datagram Protocol or a Transport Control Protocol or a Domain Name Server Protocol or an Internet protocol or a combination thereof.

25. The method of claim 22, wherein the first address and/or the second address and/or the network address is/are an Internet address.

26. The method of claim 1, wherein the method further comprises connecting the virtual machine to the network, the connecting including configuring of the virtual machine using default network configuration values provided by the management system.

27. The method of claim 26, wherein the connecting further includes connecting the virtual machine to a subnet of the network, and the configuration values are based on a predetermined subnet structure and settings for the information contained in the subnet structure are the same for the virtual machine.

28. The method of claim 26, wherein the controller monitors the network regularly to determine any network addresses on the network that are unused and provides information relating to any unused addresses to the management system.

29. A system for monitoring a computer apparatus, wherein the system is configured to establish a secure connection between the computer apparatus and a management system via a network, the computer apparatus being located at a first location and the management system being located at a second location remote from the first location;
the computer apparatus comprising a plurality of hardware components, at least one virtual machine, and a controller configured to monitor a state of the virtual machine and a characteristic of the computer apparatus and to generate monitoring results containing state information indicative of the state of the virtual machine and the characteristic of the computer apparatus;
wherein a virtual machine agent running on the virtual machine is configured to notify the controller when the state of the virtual machine is changed, and the virtual machine agent is configured to send, in response to notifying the controller, a monitoring report containing the state information indicative of the state of the virtual machine to the controller,
wherein the management system is configured to receive the monitoring results from the controller via the secure connection established via the network,
wherein the characteristic includes information relating to the plurality of hardware components.

30. The system of claim 29, comprising a plurality of computer apparatuses, each comprising at least one virtual machine, each such computer device being connectable to a network and being configurable for establishing a connection between said computer apparatus and a management system via the network, wherein the plurality of computer devices are grouped at different physical locations, such that the computer apparatus(es) of each location are connected to a same network, and all virtual machines of the computer apparatuses in respective locations are also grouped at each location, and each such location is provided a unique network address range by the management system, and at each location, wherein one of the computer devices is a gateway computer device capable of routing traffic coming to the location and leaving the location.

31. The system of claim 30, in which any virtual machine of a first location is adapted to communicate with any virtual machine of a second location, wherein the management system is adapted to instruct the respective gateway computer device of each location to establish a connection between the two virtual machines.

32. The system of claim 30, wherein the connection between the first location and the second location is established between a first tunneller node in the first location and a second tunneller node in the second location, and in which a tunneller master node is capable of facilitating establishment of said connection by a determination of the nature of each network connection of the respective gateway computer device.

33. A computer program product comprising a non-transitory computer-readable storage medium having computer-readable program code embodied therewith, the computer-readable program code configured to:
establish a secure connection between the computer apparatus and the management system via the network, the computer apparatus comprising a plurality of hardware components, the computer apparatus being located at a first location and the management system being located at a second location remote from the first location;
install a controller on the computer apparatus;
create on the computer apparatus a virtual machine,
wherein the controller monitors a state of the virtual machine and a characteristic of the computer apparatus, wherein the characteristic includes information relating to the plurality of hardware components,
wherein a virtual machine agent running on the virtual machine is configured to notify the controller when the state of the virtual machine is changed, and the virtual machine agent is configured to send, in response to notifying the controller, a monitoring report containing state information indicative of the state of the virtual machine to the controller;
wherein the controller is further configured to generate monitoring results containing the state information indicative of the state of the virtual machine and the characteristic of the computer apparatus and to report the monitoring results to the management system using the secure connection established via the network.

34. A computer apparatus comprising one or more computer programs, a plurality of hardware components, and a virtual machine, wherein the computer apparatus is configured to connect to a management system using a secure connection via a network, the computer apparatus being located at a first location and the management system being located at a second location remote from the first location, the computer apparatus further comprising a controller configured to monitor a state of the virtual machine and a characteristic of the computer apparatus, to generate monitoring results containing state information indicative of the state of the virtual machine and the characteristic of the computer apparatus, and to report the monitoring results to the management system using the secure connection established via the network, wherein the controller is located between the one or more computer programs and the virtual machine, and wherein a virtual machine agent running on the virtual machine is configured to notify the controller when the state of the virtual machine is changed, and the virtual machine agent is configured to send, in response to notifying the controller, a monitoring report containing the state information indicative of the state of the virtual machine to the controller, wherein the characteristic includes information relating to the plurality of hardware components.

35. The computer apparatus of claim 34, further comprising a physical hard disk and a virtual hard disk and further comprising encryption means for encryption and decryption by the controller of data moving between the physical hard disk and the virtual hard disk.

\* \* \* \* \*